(12) United States Patent
Martinelli

(10) Patent No.: US 12,394,330 B2
(45) Date of Patent: Aug. 19, 2025

(54) SUPPORT FOR DRIVING SIMULATORS

(71) Applicant: MARTY & NELLY S.R.L., San Martino Buon Albergo (IT)

(72) Inventor: Alex Martinelli, Minerbe (IT)

(73) Assignee: MARTY & NELLY S.R.L., San Martino Buon Albergo (IT)

( * ) Notice: Subject to any disclaimer, the term of this patent is extended or adjusted under 35 U.S.C. 154(b) by 409 days.

(21) Appl. No.: 17/796,594

(22) PCT Filed: Feb. 11, 2021

(86) PCT No.: PCT/IB2021/051110
§ 371 (c)(1),
(2) Date: Jul. 29, 2022

(87) PCT Pub. No.: WO2021/165793
PCT Pub. Date: Aug. 26, 2021

(65) Prior Publication Data
US 2023/0050558 A1  Feb. 16, 2023

(30) Foreign Application Priority Data
Feb. 17, 2020  (IT) .................. 102020000003101

(51) Int. Cl.
*G09B 9/05* (2006.01)
(52) U.S. Cl.
CPC ..................................... *G09B 9/05* (2013.01)
(58) Field of Classification Search
None
See application file for complete search history.

(56) References Cited

U.S. PATENT DOCUMENTS

| | | | | |
|---|---|---|---|---|
| 5,006,072 A | * | 4/1991 | Letovsky | G09B 9/058 348/121 |
| 5,951,404 A | * | 9/1999 | Oishi | A63F 13/245 472/60 |
| 9,186,590 B2 | * | 11/2015 | Lee | A63G 31/16 |
| 10,410,536 B2 | * | 9/2019 | Minen | G09B 9/04 |

(Continued)

FOREIGN PATENT DOCUMENTS

| | | | | |
|---|---|---|---|---|
| CN | 1289995 A | * | 4/2001 | G09B 9/058 |
| GB | 2354497 A | | 3/2001 | |

(Continued)

OTHER PUBLICATIONS

International Search Report for PCT Application PCT/IB2021/051110, May 4, 2021, 3 pages.

*Primary Examiner* — Xuan M Thai
*Assistant Examiner* — Andrew Bodendorf
(74) *Attorney, Agent, or Firm* — FERENCE & ASSOCIATES LLC

(57) ABSTRACT

A support for driving simulators including a rest base, a lower plate coupled with the rest base, an upper plate coupled with the lower plate and first and second movement means. The first movement means, interposed between the rest base and a front portion of the lower plate, is configured to move the lower plate with respect to the rest base according to a pitching and/or rolling movement. The second movement means, interposed between the lower plate and the upper plate, is configured to move the upper plate with respect to the lower plate according to a yawing movement.

13 Claims, 7 Drawing Sheets

(56) References Cited

U.S. PATENT DOCUMENTS

| | | | |
|---|---|---|---|
| 11,931,662 B2 * | 3/2024 | Smith | A63G 31/02 |
| 2008/0039216 A1 * | 2/2008 | Higashiguchi | G09B 9/02 |
| | | | 463/47 |
| 2008/0254416 A1 * | 10/2008 | Claudinon | G09B 9/00 |
| | | | 434/55 |
| 2011/0264427 A1 * | 10/2011 | Shumaker | G09B 9/12 |
| | | | 703/6 |
| 2012/0282588 A1 * | 11/2012 | Stevens | G09B 9/04 |
| | | | 434/365 |
| 2015/0030999 A1 * | 1/2015 | Lee | G09B 9/14 |
| | | | 434/62 |
| 2015/0157951 A1 * | 6/2015 | Lee | G09B 9/02 |
| | | | 472/130 |
| 2018/0075769 A1 * | 3/2018 | Mar | G09B 9/04 |
| 2022/0193561 A1 * | 6/2022 | Smith | A63G 31/02 |
| 2022/0215771 A1 * | 7/2022 | Warne | G09B 9/05 |
| 2022/0254269 A1 * | 8/2022 | Kirkman | G09B 9/12 |

FOREIGN PATENT DOCUMENTS

| | | | | |
|---|---|---|---|---|
| JP | H09269721 A | | 10/1997 | |
| JP | 3711300 B2 * | | 11/2005 | |
| JP | 2016212236 A * | | 12/2016 | |
| KR | 20090046377 A * | | 5/2009 | A63B 22/16 |
| WO | WO-2008081406 A1 * | | 7/2008 | G09B 9/02 |
| WO | WO-2008155956 A1 * | | 12/2008 | A63F 13/08 |
| WO | WO-2011064560 A1 * | | 6/2011 | A63G 19/20 |

* cited by examiner

SUPPORT FOR DRIVING SIMULATORS

The present application is a National Phase Entry of PCT International Application No. PCT/IB2021/05110, filed on Feb. 11, 2021, which claims priority to Italian Application No. 102020000003101 filed on Feb. 17, 2020, the contents of which are hereby incorporated by reference.

The present invention relates to the technical sector of the devices and systems for training in driving vehicles.

In particular, the present invention relates to a support for driving simulators and the simulator using this support.

Advantageously, the present invention can be generally applied to the world of entertainment and "e-sports" (electronic-sports). Specifically, the invention is used for training in driving vehicles, but could also be applied to the "entertainment sector", for example in: theme parks, play areas, entertainment areas, etc . . .

Preferably, the present invention is used for Gran Turismo (hereinafter abbreviated as GT) car simulators but can also be used for other types of vehicle.

The continuous and rapid increase in the calculating capacity of modern processors, especially in the graphic field, has enabled increasingly faithful and accurate representations of real environments and situations to be obtained.

The level of quality currently reached is such as to enable contexts to be created artificially that are sufficiently complex as to react in a realistic manner to the inputs that may be provided by a user.

In particular, what has been indicated above is particularly useful when applied to the systems that simulate the driving conditions of a vehicle. In fact, these systems can allow drivers to be trained to drive a vast range of vehicles in situations that, being simulated and not real, do not present any risks for the safety of the driver and a possible instructor, reducing at the same time the operating costs linked to the use thereof (such as wear to the vehicle, fuel consumption, planning a suitable training route). Structurally, currently known driving simulators are mainly used for the Formula 1 (F1) sector and are made by a series of elements and input peripheral devices that imitate the interior of the vehicle and are installed on a platform supported at the corners by the actuators resting on the ground. Selective activation of the actuators enables the platform to be moved by imitating the corresponding movements of the vehicle that is being simulated.

In particular, the actuators enable the pitching, rolling and yawing movements of the vehicles to be imitated.

Nevertheless, prior art simulation systems still have aspects that are not optimized that limit significantly the realism that is obtainable during the simulations, with particular reference to the correct reproduction of the movements of the vehicle.

These aspects are accentuated in GT simulators in which the movements have a greater excursion with respect to known simulators for Formula 1 cars.

In particular, the known systems are not able to reproduce faithfully the pitching, rolling and yawing movements, especially if these movements are very accentuated, as in the case of the GT simulator.

In this context, the technical task underpinning the present invention is to provide a support for driving simulators which obviates at least some of the drawbacks in the prior art as described above.

In particular, an object of the present invention is to make available a support for driving simulators that is able to replicate realistically and accurately all possible movements of a vehicle during a driving simulation. In particular, an object of the present invention is to make available a support for driving simulators that is able to simulate a Gran Turismo car. The defined technical task and the specified aims are substantially achieved by a support for driving simulators, comprising the technical characteristics set forth in one or more of the appended claims.

According to the present invention, a support for driving simulators is shown that comprises a rest base, a lower plate coupled with the rest base, an upper plate coupled with the lower plate and first and second movement means.

The first movement means, interposed between the rest base and the front portion of the lower plate, is configured to move the lower plate with respect to the rest base according to a pitching and/or rolling movement;

The second movement means, interposed between the lower plate and the upper plate, are configured to move the upper plate with respect to the lower plate, according to a yawing movement.

Advantageously, the specific structural conformation of the support presented here enables the means for making the pitching/rolling movements to be decoupled from those for making the yawing movements, so as to enable the means to be designed singly to optimize the distinct types of movement to be simulated.

In practice, the yawing movement is obtained with elements placed above the base and in particular owing to the second plate and to the second movement means that are arranged above the first plate.

Another object of the present invention is a driving simulator that comprises a support for driving simulators according to the present invention; a seat fitted to the upper plate in a position opposite the first movement means with respect to the central portion; at least one input/output peripheral device and a calculator configured to generate and display a simulated driving environment enabling a user to use the vehicle simulated by the input/output peripheral devices.

Advantageously, the simulator of the present invention ensures optimum performance, being able by its support to replicate in a particularly accurate and realistic manner the possible movements of a vehicle during use. The dependent claims, incorporated herein by reference, correspond to different embodiments of the invention.

Additional features and advantages of the present invention will become more apparent from an approximate, and thus non-limiting, description of a preferred, but non-exclusive embodiment of a support for driving simulators, as illustrated in the appended drawings, in which.

Figure 1:
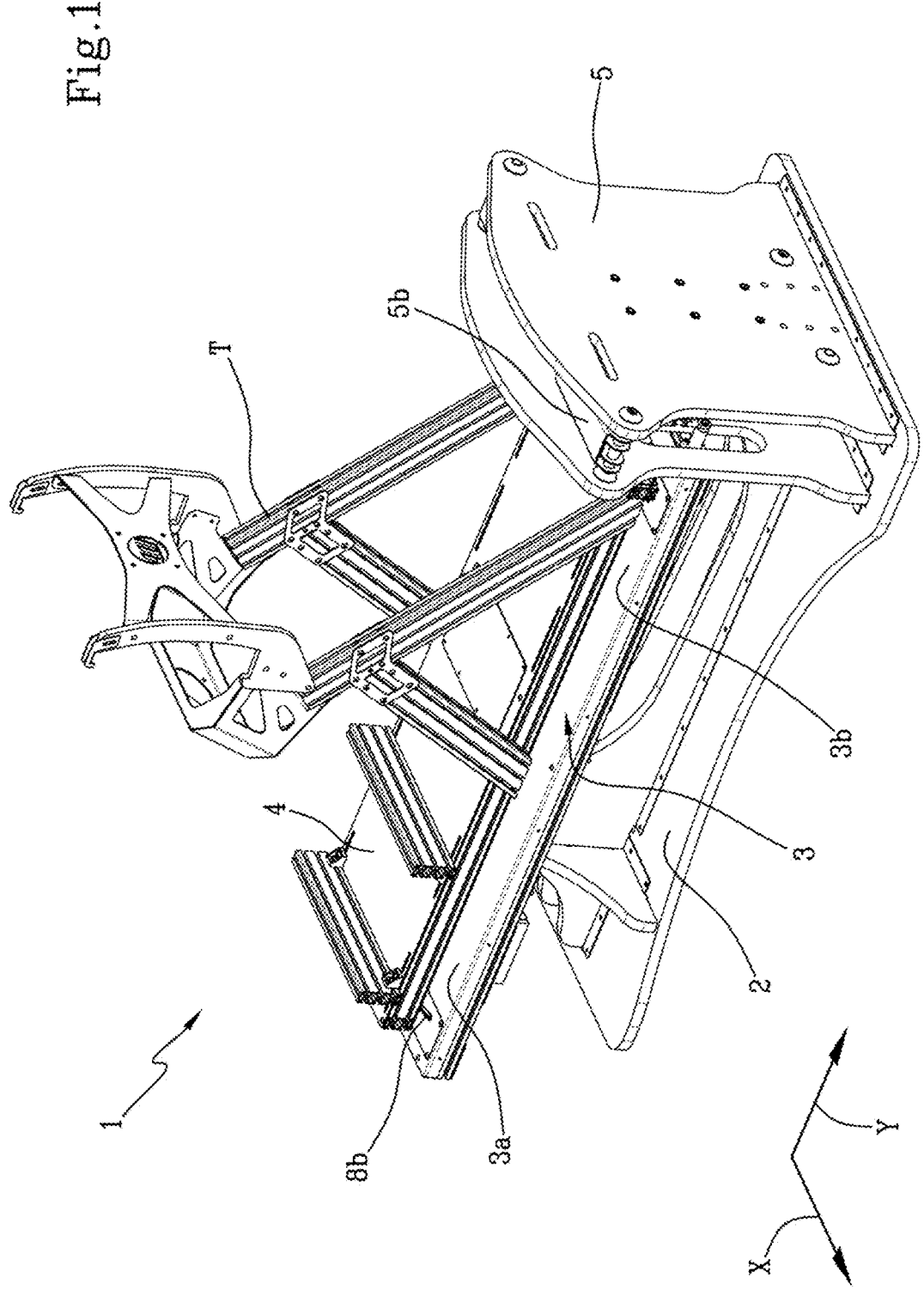
FIG. 1 shows a view of the support according to the present invention.

In the appended figures, the numerical reference 1 indicates in general a support for driving simulators, identified hereinafter in the present description simply as the support 1.

The support 1 comprises a rest base 2 that interfaces the support 1 with the floor on which it rests and which supports a lower plate 3 and an upper plate 4.

Operationally, the lower plate 3 and the upper plate 4 overall combine to define the platform that in use will be moved to replicate the movements of the simulated vehicle.

More in detail, the lower plate 3 has a rear portion 3*a* at which the rest base 2 is coupled with a front portion 3*b* the function of which will be discussed in detail below.

Figure 2:
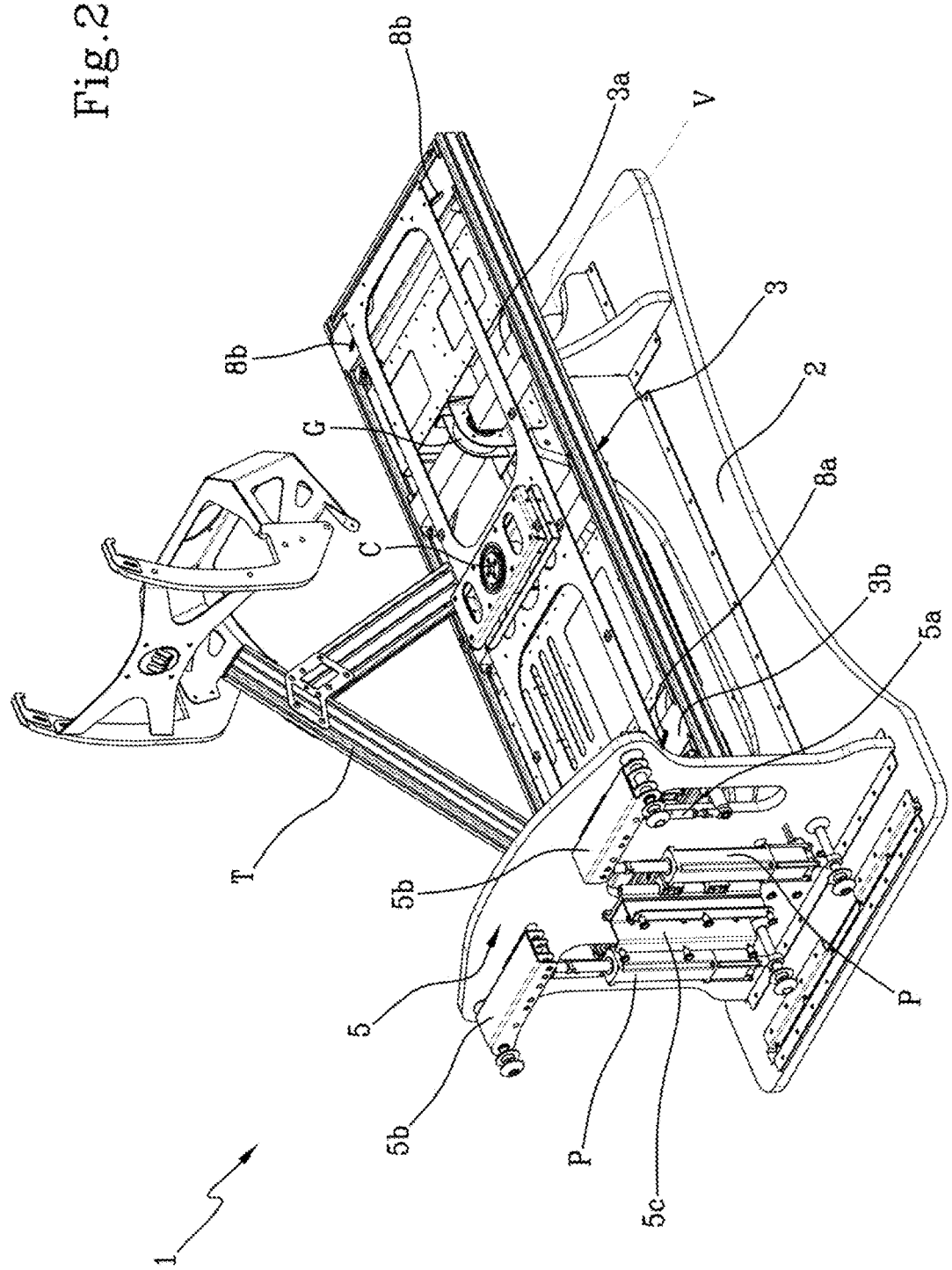
FIG. 2 shows a view of the support of FIG. 1 with some components hidden to show the coupling between the plates and with the rest base.

In particular, as can be observed in FIG. 2, the rear portion 3*a* is coupled with the rest base 2 by a joint "G" that enables the lower plate 3 to be movable with respect to the rest base 2 around a pivot defined by the joint Preferably, the lower plate 3 defines in cooperation with the rest base 2 a housing "V" adapted to receive inside one or more electronic components of a driving simulator.

For example, inside the housing "V" at least part of the cabling can be contained that is necessary for the operation of the various components of the driving simulator in which the present support 1 is implemented. The upper plate 4 has on the other hand a central portion 4*a* at which it is coupled with the lower plate 3.

Figure 3:
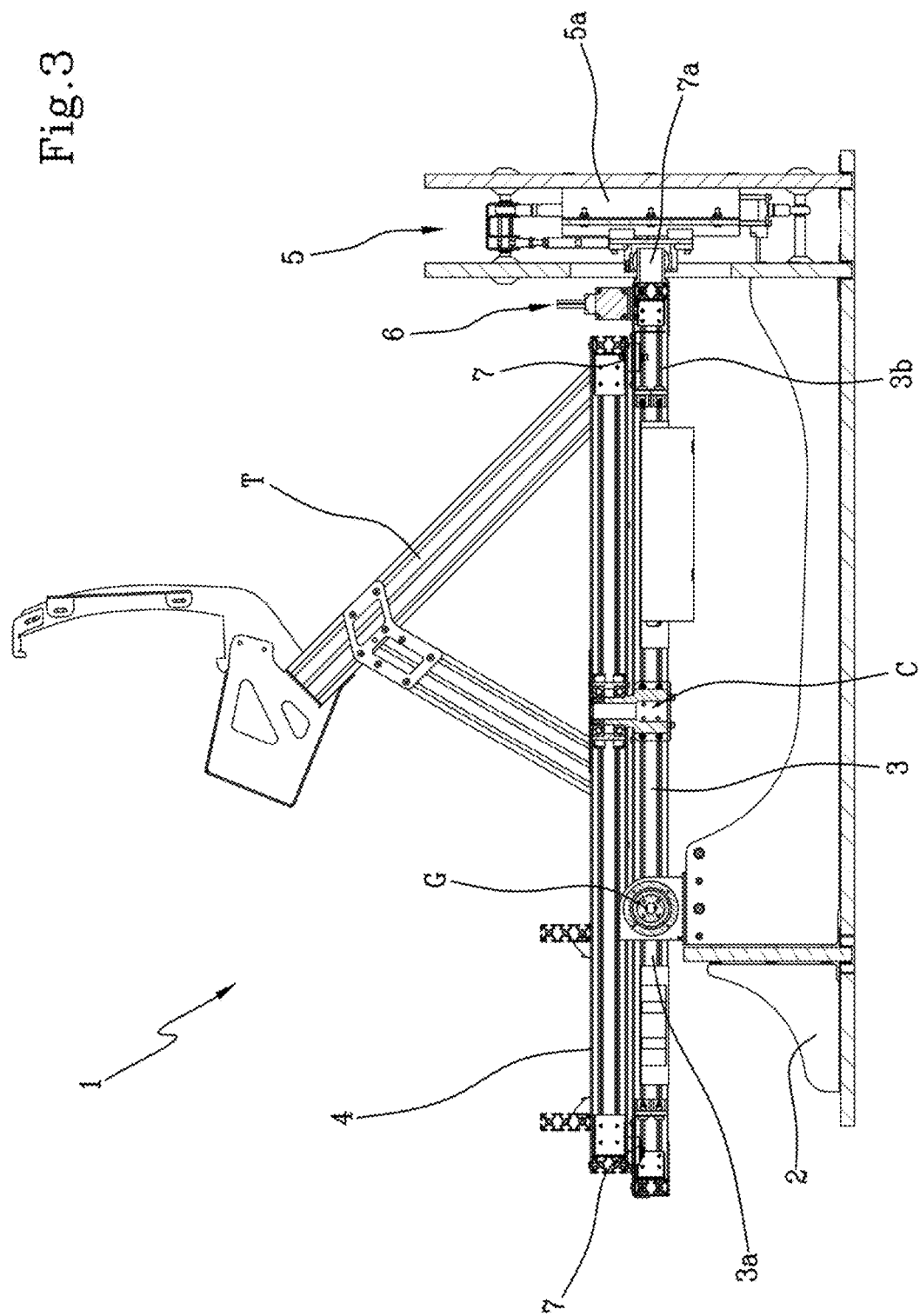
FIG. 3 shows a longitudinal section of the support.
Figure 4:
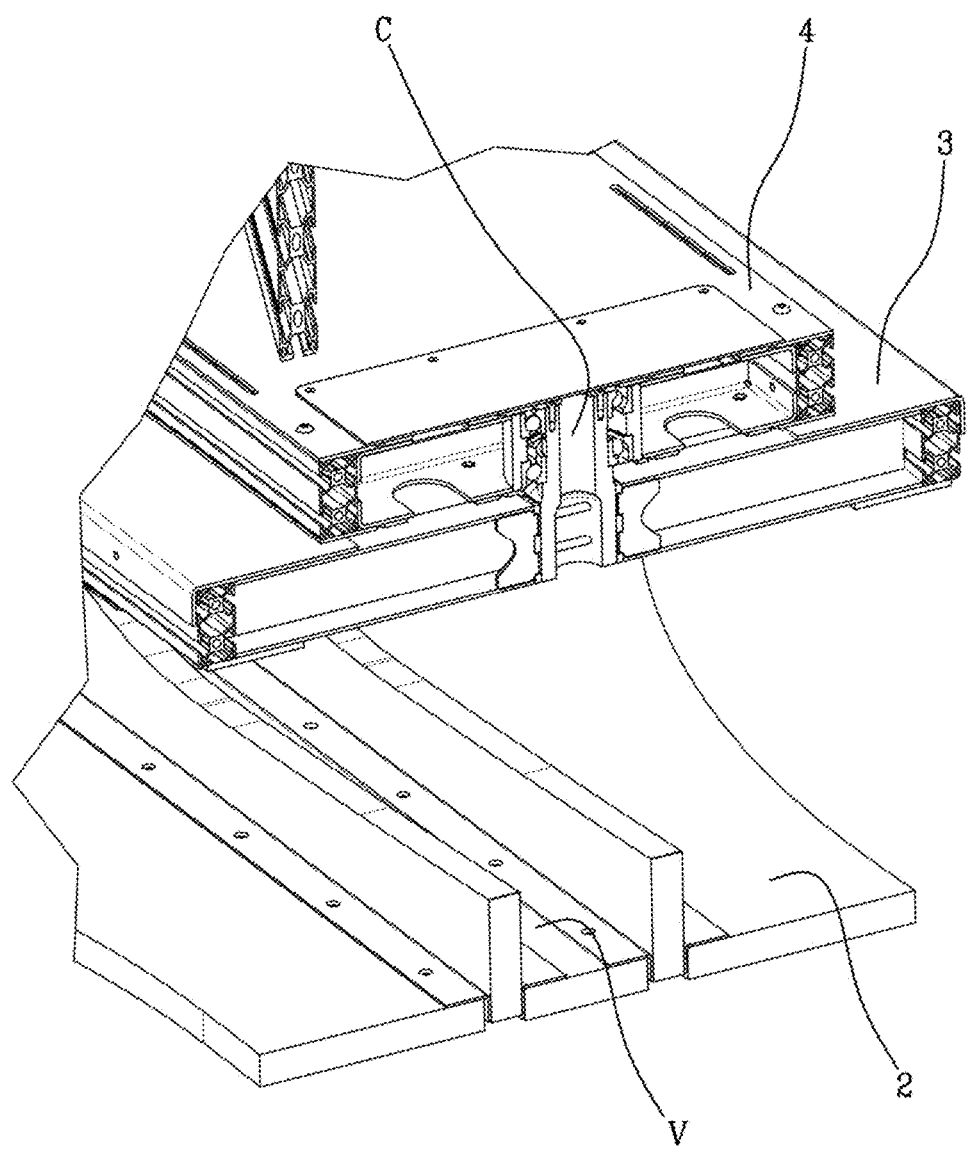
FIG. 4 shows a cross section of the coupling portion between the plates that make up the support.

Preferably, the central portion 4*a* of the upper plate 4 coincides with a respective central portion of the lower plate 3, such that the two plates 3, 4 are substantially superimposed, as can be observed for example in FIG. 1. In particular, as can be observed in the section of FIG. 3 and in greater detail in FIG. 4, the coupling between the lower plate 3 and the upper plate 4 can be obtained by a "C" ball bearing interposed between the two. Preferably, the ball bearing is thus arranged at the central portion 4*a* and has a first ring (for example the outer ring) coupled with the upper plate 4 and a second ring (for example the inner ring) coupled with the lower plate, so as to permit rotation around the "C" ball bearing of one plate 3, 4 with respect to the other plate.

Further, according to one aspect of the present invention, the upper plate 4 is configured to house at least one input/output peripheral device of a driving simulator.

In other words, the upper plate 3 can be coupled with one or more of the further constituent elements of the driving simulator, defining in fact the base of the structure that replicates the interior of the vehicle that it is desired to replicate.

In particular, as can be observed in the enclosed figures, the upper plate 4 can be coupled with a "T" frame on which possible peripheral devices of the simulator such as for example a steering wheel can be constrained.

The support 1 further comprises a first movement means 5 and a second movement means 6 that are selectively activatable to move the plates 3, 4 in such a manner as to simulate the movements of the vehicle.

In particular, the first movement means 5 is interposed between the rest base 2 and the front portion 3*b* of the lower plate 3 and is configured to move the lower plate 3 with respect to the rest base 2 according to a pitching and/or rolling movement;

Preferably, the first movement means 5 is arranged beyond (i.e. outside the overall dimensions of the lower plate 3) the front portion 3*b* of the lower plate 3 with respect to a plane defined by the lower plate 3.

Further, the first movement means 5 extends for a height that is overall greater than the height of the lower plate 3 with respect to the rest base 2 according to a vertical direction.

In other words, the first movement means 5 is so coupled with the front portion 3*b* as to move the front portion 3*b* with respect to the rest base 2 on which the front portion is pivoted 3*b*, making the lower plate 3 oscillate with respect to a transverse axis "X" and/or longitudinal axis "Y" thereof to imitate respectively the pitching and/or rolling movements of the vehicle.

Figure 5:
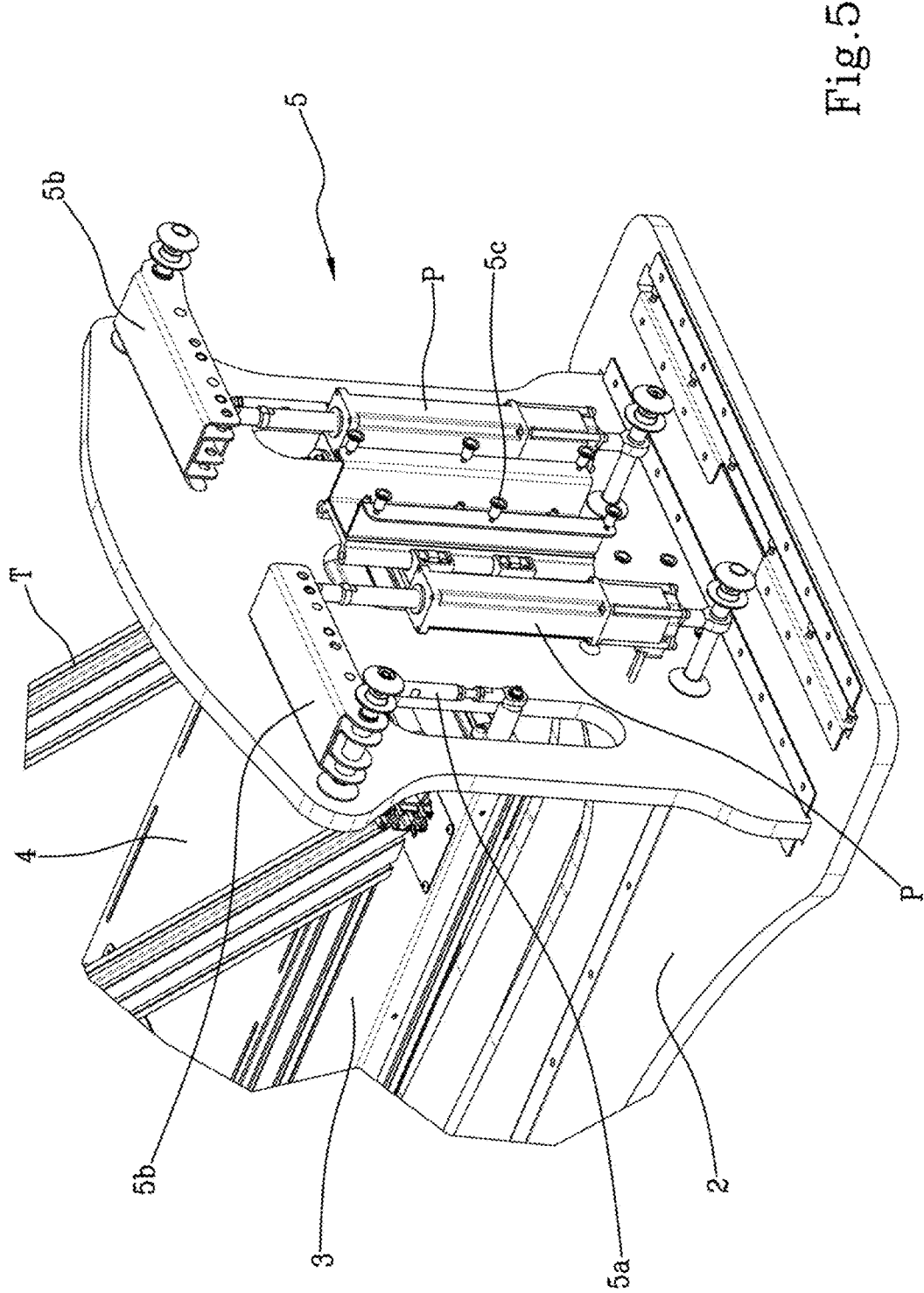
FIG. 5 shows in detail the first movement means.

According to one aspect of the present invention, shown in particular in FIG. 5, the first movement means 5 comprises a pair of actuators, for example of the linear actuators "P", which are active on respective opposite sides of the front portion 3*b*. Preferably, these linear actuators "P" comprise respective step motors.

As can be observed in particular in FIGS. 2 and 5, the linear actuators "P" are coupled with the lower plate 3 by respective coupling means that each comprises a vertical arm 5*a*, which is arranged parallel to the respective linear actuator "P" and secured to one side of the lower plate 3, and a connecting arm 5*b* interposed between the two.

In detail, the connecting arm 5*b* has a first end coupled with the linear actuator "P" and a second end pivoted in a fixed position, whereas the vertical arm 5*a* is coupled with the connecting arm 5*b* between the first and the second end.

In use, when the linear actuator "P" is activated, the connecting arm 5*b* rotates around its own second end, causing during rotation thereof the movement of the vertical arm 5*a*, which in turn raises/lowers the side of the lower plate 3 to which it is constrained.

Advantageously, the connecting arm 5*b* can act as a rocker, to define or combine to define a stroke limit for moving the lower plate 3 in particular when a rolling movement is simulated.

The actuators are selectively activatable to raise or lower the respective opposite sides, causing oscillation of the lower plate 3 thereof and thus simulating the pitching and/or rolling movements.

Operationally, when the actuators are activated to raise or lower both the respective sides, the lower plate 3 (which is constrained on the rest base 2 at the rear portion 3*a* thereof) will oscillate around its transverse axis "X", simulating a pitching movement.

When on the other hand one of the actuators is activated to lower and the other actuator is activated to raise the respective side, the lower plate 3 will oscillate around its transverse axis "Y", simulating a rolling movement In order to prevent the lower plate 3 from being able to move erroneously in a substantially horizontal direction (i.e. parallel to a main plane of extension thereof), the first movement means 5 comprises a linear guide 5*c* that extends vertically and the front portion 3*b* comprises a pin 7*a* that is insertable into the linear guide 5*c* and is slidable therewithin.

In other words, the linear guide 5*c* constrains the lower plate 3 to perform only movements in a vertical direction (adapted to simulate the pitching of the vehicle) and in rotation around the longitudinal axis "Y" (adapted to simulate the rolling of the vehicle).

Advantageously, the linear guide can also define or combine to define a stroke limit for moving the lower plate 3 when a pitching movement is simulated. Further, this end stroke is defined preferably also by the lever ratio present between each vertical arm 5*a* and the respective linear actuator "P" on the connecting arm 5*b*.

The second movement means 6 is on the other hand interposed between the lower plate 3 and the upper plate 4 and is configured to move the upper plate 4 with respect to the lower plate 3 according to a yawing movement.

In other words, the second movement means 6 acts on the upper plate 4 in such a manner as to move it to rotate around its central portion 4*a*, at which it is pivoted on the lower plate 3.

Structurally, the second movement means 6 can comprise an actuator, which also in this case is achievable by a linear actuator, configured to rotate the upper plate 4 with respect to the lower plate 3 around the central portion 4a, thus causing the yawing movement.

Figure 6:
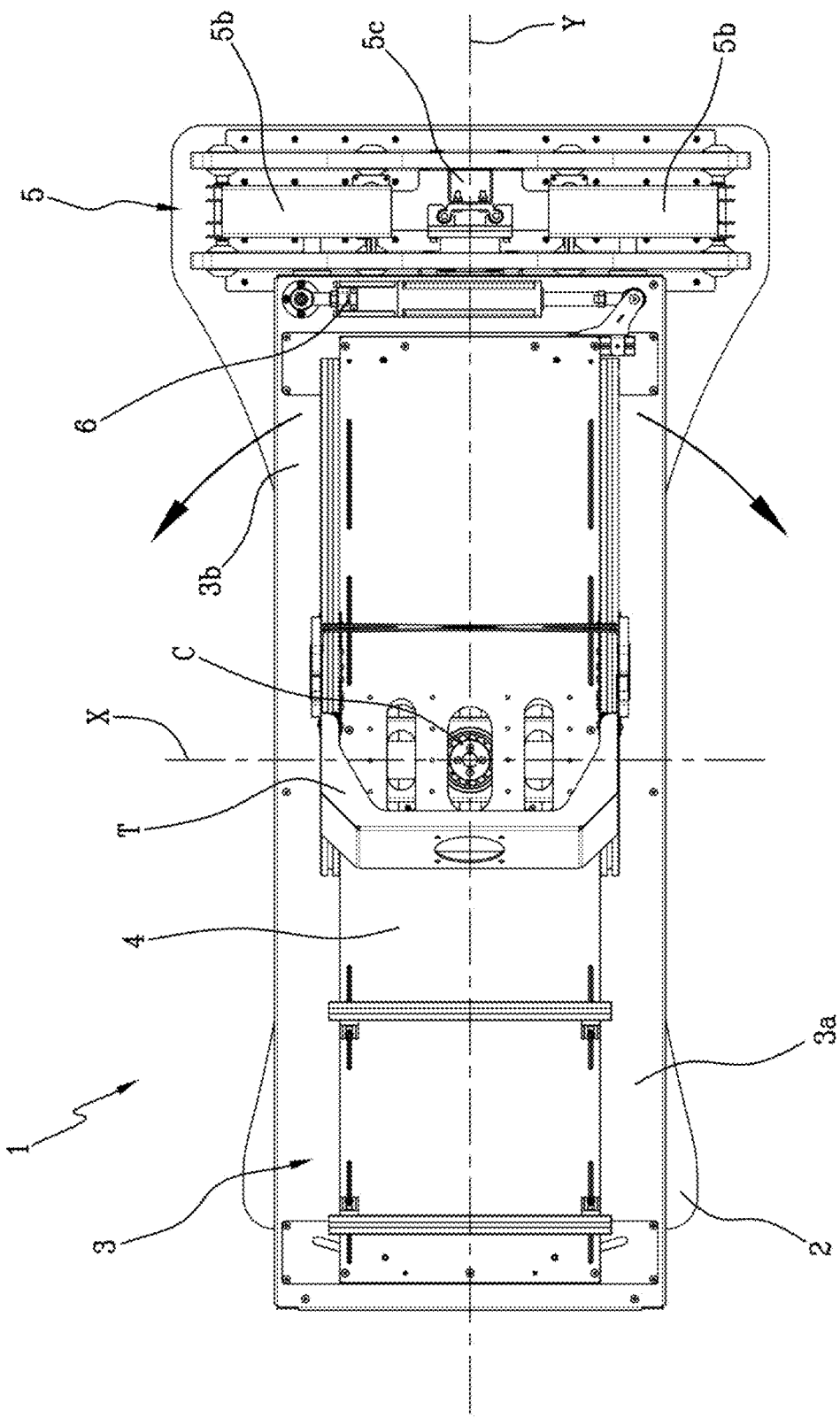
FIG. 6 shows a top view of the support.

According to one aspect of the present invention, shown in particular in FIG. 6, the second movement means 6 is coupled with the lower plate 3 at the front portion 3b thereof, or is arranged at the first movement means 5.

In this manner, the presence of the first and second movement means 5, 6 in the front part of the support 1 enables the experience of the user to be improved by replicating effectively during simulation also the sensation that is given in a vehicle by the weight of the vehicle.

In order to ensure correct movement of the upper plate with respect to the lower plate 3, the second comprises at least one front guide 8a, preferably two front guides 8a, and at least one rear guide 8b, preferably two rear guides 8b, and the upper plate 4 comprises at least two pins 7 that are slidable respectively in the at least one front guide 8a and in the at least one rear guide 8b.

In other words, the plates 3, 4 comprise coupling means that is slidable in relation to one another that constrains the upper plate 4 to rotate with respect to the lower plate 3 following a circumference arc trajectory, limited by the extension of the front guide 8a and of the rear guide 8b that thus define operationally end strokes for the rotation of the upper plate 4. During operation of the support 1, the stroke limit of said arc trajectory is defined by the stroke of the actuator of the second movement means 6 (in other words, the stroke limits defined by the front guide 8a and of the rear guide 8b are never reached).

The presence of the front guide 8a and rear guide 8b and the relative pins 7 further enable further resting points to be provided for the upper plate 4, making the structure of the support 1 more stable and resistant, in particular during movement of the plates 3, 4.

Advantageously, the present invention achieves the proposed objects, obviating the drawbacks lamented in the prior art, making available to the user a support for driving simulators that has an optimized movement mechanism.

Figure 7:
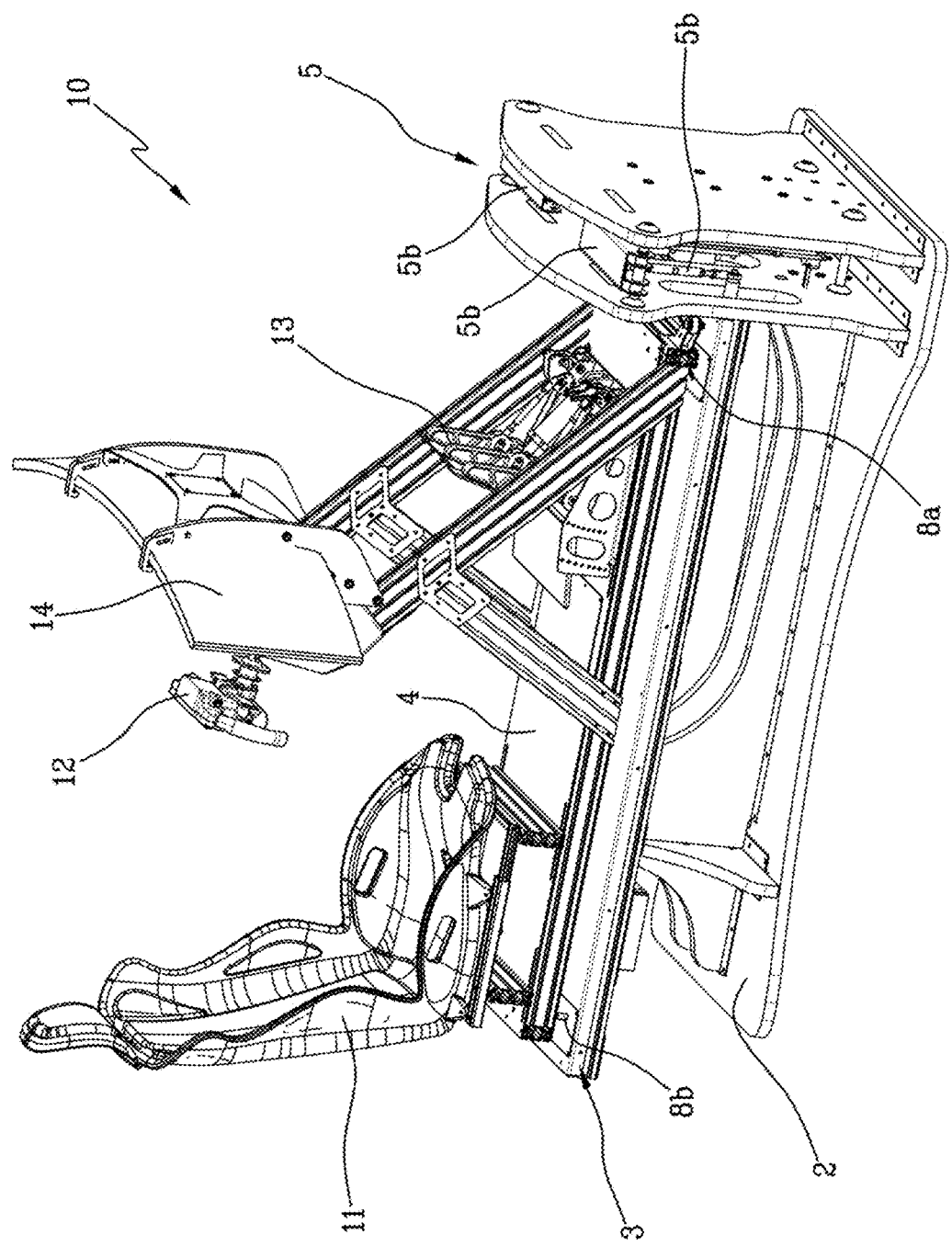
FIG. 7 shows a view of the driving simulator that comprises the support of FIG. 1.

This mechanism enables all the types of movement to be simulated effectively that the vehicle can perform that it is desired to simulate, with reference in particular to the yawing movements. Another object of the present invention is a driving simulator 10, shown in FIG. 7, which comprises a support 1 having one or more of the features indicated above.

The simulator further comprises a seat 11 fitted to the upper plate 4 and, preferably, which is integral with the latter so as to follow the movements of the upper plate 4.

Preferably, the seat 11 is fitted in a position opposite the first movement means 5 with respect to the central portion 4a.

In this manner, as already indicated, it is possible to replicate realistically also the sensation of weight that is generated in a vehicle by the presence of the engine.

The simulator 10 further comprises at least one input/output peripheral device at least one of which is: a steering wheel 12, a pedal board 13, a gearbox, a screen 14.

In particular, the screen 14 can be part of the simulator 10, or the simulator can comprise suitable interface means that permits connection thereof to an outer screen that is not comprised in the simulator 10.

Further, the simulator 10 comprises a calculator configured to generate and display a simulated driving environment and enable a user to use the simulated vehicle in the simulated driving environment, using the at least one input/output peripheral device.

In particular, the calculator is configured to activate selectively the first movement means 5 and the second movement means 6 as a function of at least one of: the inputs supplied by the user by the at least one input/output peripheral device, simulated driving environment and characteristics of the simulated vehicle.

In this manner, the first and the second movement means 5, 6 act respectively on the lower plate 3, to replicate the pitching and rolling movements of the vehicle, and on the upper plate 4, to replicate the yawing movements.

Advantageously, the simulator 10 presented here is more accurate than the systems disclosed in the prior art, providing more and more precise and realistic simulations owing to the support 1 thereof.

The invention claimed is:

1. A support for driving simulators comprising:
   a rest base;
   a lower plate having a rear portion coupled with said rest base and a front portion;
   first movement means, interposed between the rest base and the front portion of the lower plate, configured to move the lower plate with respect to the rest base according to a pitching and/or rolling movement;
   an upper plate arranged above the lower plate according to a vertical direction and having a central portion coupled with the lower plate;
   a second movement means, interposed between the lower plate and the upper plate, configured to move the upper plate with respect to the lower plate, according to a yawing movement;
   wherein the first movement means comprises a pair of linear actuators active on respective opposite sides of said front portion and selectively activable for raising or lowering the respective sides, leading to said pitching and rolling movement of the lower plate;
   each of said linear actuators being coupled with said lower plate by respective coupling means that each comprises a vertical arm, which is arranged parallel to the respective linear actuator and secured to one side of the lower plate and a connecting arm interposed between said vertical arm and the respective linear actuator; said connecting arm having a first end coupled with the respective linear actuator and second end pivoted in a fixed position, wherein the vertical arm is coupled with the connecting arm between the first and the second end.

2. The support according to claim 1, wherein the first movement means comprises a linear guide extending vertically and the front portion comprises a pin that is slidable in said linear guide.

3. The support according to claim 2, wherein said linear actuators are step motors.

4. The support according to claim 1, wherein the connecting arm has a first end coupled with the linear actuator and a second end pivoted about a fixed position, whereas the vertical arm is coupled with the connecting arm between the first and the second end.

5. The support according to claim 1, comprising a ball bearing configured to couple rotationally the upper plate with the lower plate, said ball bearing being arranged at said central portion.

6. The support according to claim 1, wherein the second movement means is coupled with the front portion of the lower plate at the first movement means.

7. The support according to claim 1, wherein the second movement means comprises an actuator configured to rotate the upper plate with respect to the lower plate around the central portion, leading to said yawing movement.

8. The support according to claim 1, wherein the lower plate comprises at least one front guide and at least one rear guide, and the upper plate comprises at least two pins that are slidable respectively in the at least one front guide and in the at least one rear guide.

9. The support according to claim 1, wherein the rear portion is coupled with the rest base by a joint that enables the lower plate to be movable with respect to the rest base around a pivot defined by the joint.

10. The support according to claim 1, wherein the upper plate is configured to house at least one input/output peripheral device of a driving simulator.

11. The support according to claim 1, wherein the lower plate and the rest base define a housing adapted to receive one or more electronic components of a driving simulator.

12. The support according to claim 1, wherein the first movement means is arranged beyond the front portion of the lower plate with respect to a plane defined by the lower plate.

13. A driving simulator comprising:
a support for driving simulators according to claim 1;
a seat integrally mounted on the upper plate so as to follow the movements of the upper plate; at least one input/output peripheral device comprising at least one of: a steering wheel, a pedal board, and a screen; configured to display a simulated driving environment to a user and enable the user to use a simulated vehicle in the simulated driving environment by using at least one input/output peripheral device.

* * * * *